US006055468A

United States Patent [19]

Kaman et al.

[11] Patent Number: 6,055,468

[45] **Date of Patent: *Apr. 25, 2000**

[54] VEHICLE SYSTEM ANALYZER AND TUTORIAL UNIT

[75] Inventors: Richard A. Kaman, Spring Grove; Jack Paul, Arlington Heights, both of Ill.

[73] Assignee: Products Research, Inc., Addison, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/511,724

[22] Filed: Aug. 7, 1995

[51] Int. Cl.[7] .............................. G06F 11/22; H04B 7/26

[52] U.S. Cl. .............................. 701/29; 701/33; 340/439; 340/870.16

[58] Field of Search .............................. 364/551.01, 570; 340/870.16, 870.44, 438, 439; 342/82, 89; 375/200, 220; 73/116, 117.1, 118.1; 455/95; 701/29, 35, 101, 115, 33

[56] References Cited

U.S. PATENT DOCUMENTS

| | | | |
|---|---|---|---|
| 4,009,375 | 2/1977 | White et al. | 364/436 |
| 4,188,618 | 2/1980 | Weisbart | 340/870.16 |
| 4,270,174 | 5/1981 | Karlin et al. | 364/431.12 |
| 4,404,639 | 9/1983 | McGuire et al. | 364/424.04 |
| 4,873,526 | 10/1989 | Katsuo | 342/359 |
| 4,926,331 | 5/1990 | Windle et al. | 364/424.04 |
| 4,989,146 | 1/1991 | Imajo | 364/551.01 |
| 5,025,452 | 6/1991 | Sohner | 375/200 |
| 5,157,610 | 10/1992 | Asano et al. | 364/424.03 |
| 5,227,766 | 7/1993 | Endo | 340/635 |
| 5,257,190 | 10/1993 | Crane | 73/117.2 |
| 5,396,422 | 3/1995 | Forchert et al. | 340/438 |
| 5,400,018 | 3/1995 | Scholl et al. | 340/825.54 |
| 5,450,321 | 9/1995 | Crane | 701/35 |
| 5,506,772 | 4/1996 | Kubozono et al. | 364/431.01 |
| 5,583,912 | 12/1996 | Schillaci et al. | 379/21 |
| 5,884,202 | 3/1999 | Arjomand | 701/29 |

FOREIGN PATENT DOCUMENTS

| | | |
|---|---|---|
| 34660 | 10/1991 | Japan . |
| 2263376 | 2/1992 | United Kingdom . |

*Primary Examiner*—Tan Nguyen
*Attorney, Agent, or Firm*—Welsh & Katz, Ltd.

[57] ABSTRACT

A vehicle analyzer and tutorial system is provided. The unit includes an engine analyzer and display unit. The unit further includes a remote controller and display unit, operably interconnected with the engine analyzer and display unit through a radio frequency interface, for remotely monitoring the engine analyzer display and for controlling the engine analyzer.

33 Claims, 4 Drawing Sheets

VEHICLE SYSTEM ANALYZER AND TUTORIAL UNIT

FIELD OF THE INVENTION

The field of the invention relates to vehicle defect analysis and in particular to portable engine analyzers that may be used during vehicle operation and the use thereof.

BACKGROUND OF THE INVENTION

Engine analyzers are known. Such devices, in the past, have typically been multifunction testers that could be interconnected with a number of functional areas of an engine for testing purposes. Often a single set of test leads were provided and functional areas of engines were tested one at a time with tester controls changed, as appropriate, to accommodate the test location.

Testing functions have included such parameters as ignition spark timing, battery voltage, and starter current. Other tested functions have included spark dwell, spark voltage, manifold vacuum, etc.

As engines have become more sophisticated, engine analyzers have also become more sophisticated. With increasing fuel prices and stricter emission controls, computers have become a necessary part of engine control systems. Engine analyzers, in order to troubleshoot computer controlled engine systems, have also become computer based.

With the recognition that automobiles are a major contributor to air pollution, automobile manufacturers of performance cars and otherwise have come to rely on computers as a means of controlling engine operating parameters while maximizing efficiency. Computers have been relied upon because of their almost infinite ability to adapt to a changing engine operating environment while optimizing engine operating parameters.

For example, it has long been known that a cold automobile engine requires a richer air-fuel mixture than a warm engine for proper operation. Even after an engine has reached a normal operating temperature, the air-fuel mixture must be constantly adjusted to changing load conditions. An idling engine, for example, need only be supplied with enough fuel to maintain an idle speed at 4 constant number of revolutions per minute (RPM), whereas an engine under load requires a much richer fuel mixture.

To improve combustion efficiency, fuel injection has been increasingly relied upon as a means of achieving an optimal air-fuel mixture across the full range of engine speeds and loads. In fuel injection systems, a precise volume of fuel is sprayed either directly into the combustion chamber or into the air stream during an intake period of each combustion cycle. The volume of fuel introduced during an injection cycle is usually controlled by a fuel injection control module based upon a throttle position.

The timing of the fuel injection is critical to good air-fuel mixing. If the timing of the injection is early or late the sprayed fuel simply condenses on the bottom of the intake manifold. The condensed fuel then enters the cylinders during subsequent intake cycles as a liquid instead of a vapor resulting in poor and incomplete combustion.

Another factor in ensuring complete combustion of the air-fuel mixture in the combustion chamber is the proper timing of a combustion spark. In the past, proper timing of the spark was controlled through a coil firing and spark distributing circuit (distributor) mechanically coupled to the engine camshaft. As a cylinder entered a combustion stroke, the mechanical movement of the camshaft positioned a rotor within the distributor towards a contact of a high voltage wire to the spark plug. At a pre-determined number of degrees before a piston within the combustion cylinder reached its upper-most position (top dead center (TDC)), an ignition control module associated with the distributor senses the position of distributor rotor shaft and applies a voltage pulse to an ignition coil firing the spark plug through the rotor and distributor.

Other ignition systems of more recent design (distributorless ignition systems) may provide an ignition coil for each pair of combustion cylinders while others provide a coil for each cylinder. A separate ignition module firing circuit is provided for each ignition coil. Such ignition systems do not have a distributor coupled to the camshaft for triggering a combustion spark through the coil and instead rely on solid state sensors (e.g., Hall effect sensors, magnetic pick-up coils, etc.) that are typically placed proximate the camshaft and crankshaft for detecting engine position. Such systems typically have a number of actuator structures (e.g., slots, cogs, pins, etc.) attached to the camshaft and crankshaft for activating the sensors, for proper firing of individual ignition modules.

The solid state sensors (crankshaft and camshaft) often provide signals to a control module that provides control for the generation of ignition and fuel injection control signals. Ignition and injector control, in fact, is often consolidated into a single engine control module (ECM).

While the consolidation of engine control functions into a small number of control modules has improved engine performance and reduced pollution, malfunctions have become harder to detect and resolve. Often, malfunctions are manifested in an intermittent manner or will only occur when an engine is under load (e.g., when a vehicle is accelerating). A technician must often resort to test drives in an effort to isolate and correct a problem. Unfortunately, where a vehicle is being driven, it is difficult to use sophisticated analyzers and test equipment as a means of isolating a source of a problem. Even where test equipment is portable and can be used in a moving vehicle, a second technician is usually required to operate the vehicle while the first technician operates the test equipment.

Technical training has also become a problem in the operation of the increasingly sophisticated test equipment that must be used with late model automobiles. Often a technician is as much a computer operator as troubleshooter. Even where a technician is proficient in computer operation, the interconnection of computer based test equipment with the automobile challenges the proficiency of even the most skilled technician.

Accordingly, it is an object of this invention to provide a method and an apparatus for testing motor vehicles that is portable and does not require a number of technicians to operate.

It is a further object of the invention to provide an apparatus that adapts to system abnormalities, either detected automatically by the apparatus or entered via a menu by a technician, as a means of detecting and quickly isolating faults It is a further object of the invention to provide an apparatus for testing motor vehicles that is adaptable to a variety of models and manufacturers.

It is a further object of the invention to provide an apparatus that is as much a teaching tool as a troubleshooting tool.

It is a further object of the invention to provide an interactive troubleshooting tool that interacts both with the automobile being analyzed and with a remotely located instructor teaching a technician how to use the interactive troubleshooting tool.

SUMMARY OF THE INVENTION

A vehicle analyzer and tutorial system is provided. The system includes an engine analyzer and display unit. The system further includes a remote controller and display unit, operably interconnected with the engine analyzer and display unit through a radio frequency interface, for remotely monitoring the engine analyzer display and for controlling the engine analyzer.

DESCRIPTION OF A PREFERRED EMBODIMENT

Figure 1:
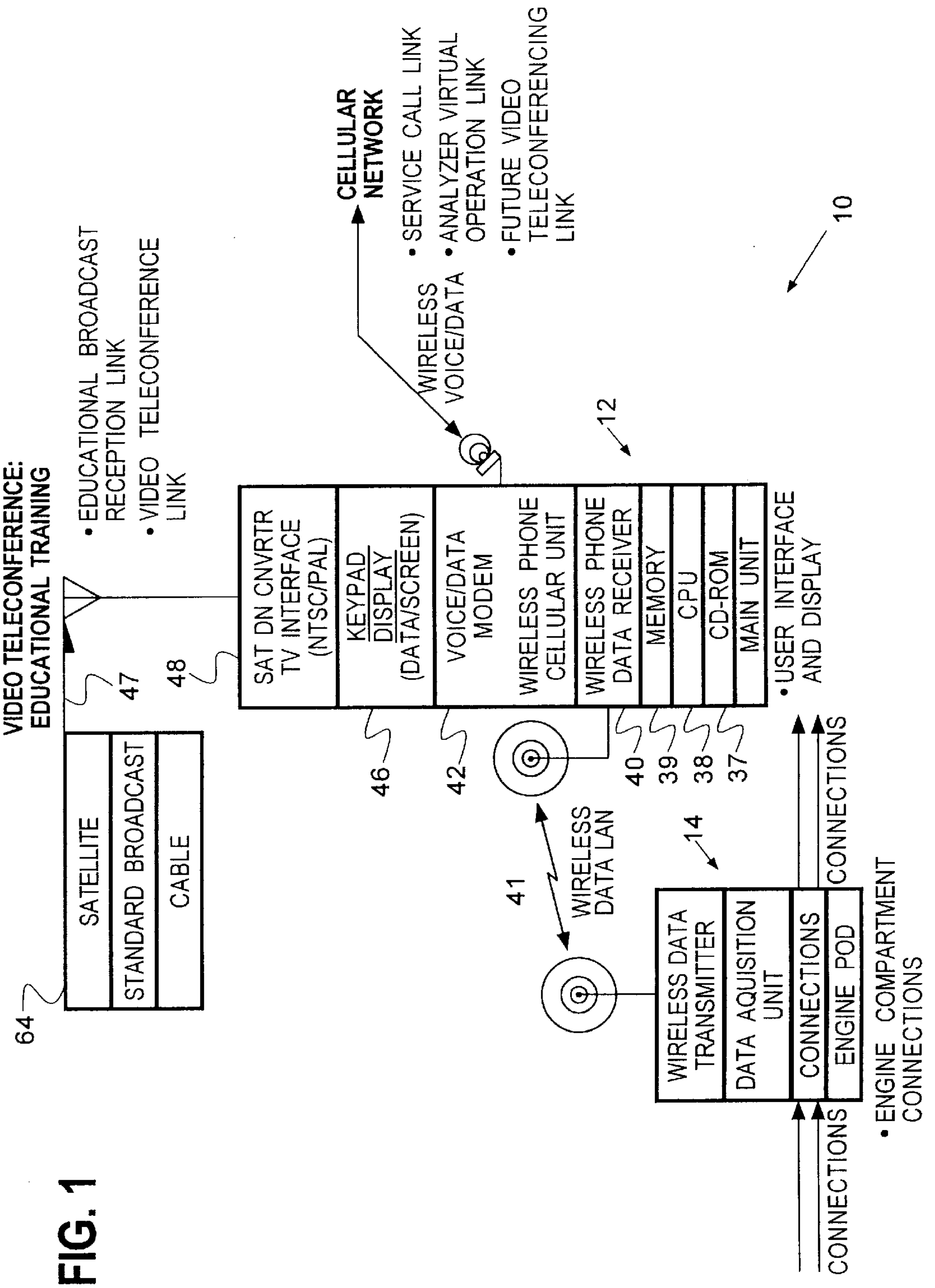
FIG. 1 is a block diagram of the vehicle system analyzer and tutorial unit in accordance with an embodiment of the invention.

FIG. 1 shows a block diagram of a engine analyzing and tutorial system 10 generally in accordance with an embodiment of the invention. The system 10 is generally adapted for use with automobiles, trucks, construction equipment, or any other application where the equipment under test requires remote testing and troubleshooting.

The engine analyzing and tutorial system 10 is a complete automotive powertrain and body system diagnostic analyzer, contained in two small rugged portable packages. The first of the packages, main unit 12, contains a operator interface keyboard 46*b*, display 46*a*, central processor 38, and telecommunications input/output 40, 42*a*, 42*b*, 48. The packaging of the system 10 is completely portable, battery powered, and closes up into a durable, rugged housing. The second package, engine pod 14, allows hard connections to be made in the engine compartment of a test vehicle (not shown) but features a wireless interface to the main unit 12. The engine pod 12 is stored inside the main unit 12 until used.

The system 10 functions to provide signal measurement, signal generation, diagnostic fault tree analysis, and repair-specific information in a graphical video format. In the case where the vehicle is an automobile, the system 10 is not completely dependent on the vehicle's diagnostic link for its analysis. The serial link in most automotive applications typically provides a limited amount of diagnostic information. Further, the Original Equipment Manufacturers (OEMs) have not allowed useful bi-directional control to be incorporated into "scan" type functions of external diagnostic devices. The system 10 is not so limited because it is positioned in the wire harness before the vehicle control computer. Bi-directional measurement and simulated signals are used to greatly expand diagnostic capability.

The system 10 makes two types of connections, via the engine pod 14, to engine and powertrain components of the test vehicle. First the system 10 connects between the vehicle controlling computer (electronic control unit (ECU)) and its wire harness. The system 10 monitors signals/sensor inputs to the ECU and actuator/solenoid control outputs, as well as intercepting these signals inserting its own. In this way the system 10 bolsters its diagnostic strength by electrically isolating the ECU in the context of use, thereby allowing expected outputs of the ECU to be compared with actual outputs.

The main unit 12 includes, in addition to the processor 38, a compact disk read only memory (CD-ROM) 37. The CD-ROM 38 contains data and vehicle specifications for a selected group of vehicles to be tested. The processor 38, upon entry of an identifier of a particular vehicle, can retrieve detailed data for the vehicle for use in evaluating faults in the vehicle (e.g., by comparing test results with threshold values contained in the detailed data). The detailed data can also be used to provide visual prompts on a display 46 of the vehicle, of principle components of the vehicle, and of connection points on the vehicle for troubleshooting. The detailed data includes schematics, wiring diagrams, photo-quality pictures of components and component locations, technical service bulletins (TSBs), part-number information, and other data supporting the repair/replacement process.

The engine pod unit 14 is primarily a data collection unit that may be interconnected with a vehicle under test. The engine pod unit 14, however, may also be used as an engine controller to create certain test conditions, such as by simulating certain engine operating parameters (e.g., engine temperature, throttle position, engine rotational position, etc.).

The system 10 presents a new approach to vehicle troubleshooting and defective component pin-pointing. The new method consists of utilizing the ECU/wire harness interface as a source of diagnostic information. All of the various sensor and system inputs, as well as controlled outputs are available at this interface. The interception of the input and output signals allows the system 10 to analyze the current operating condition of the vehicle (or engine), to monitor the output response of a specific controller, and to make changes to input/output signals to further increase diagnostic strength and efficiency. The system 10 decides what passes and what fails a test based on stored characterizations of the vehicle system, and may continue its diagnostic probing based upon the results of the previous test. The tests performed by the system 10 may be performed automatically, but it can suggest certain test procedures, via the display 46*a*, for the operator to perform as a means of optimizing the analysis process. Often, just as important, the system 10 can allow the knowledgeable operator to direct certain test paths, again with the goal of minimum analysis time. At any point along the diagnostic path, the operator may access repair and replacement instructions, including video screens showing wiring diagrams, component locations, part numbers, removal and replacement information, as well as TSBs.

Figure 2:
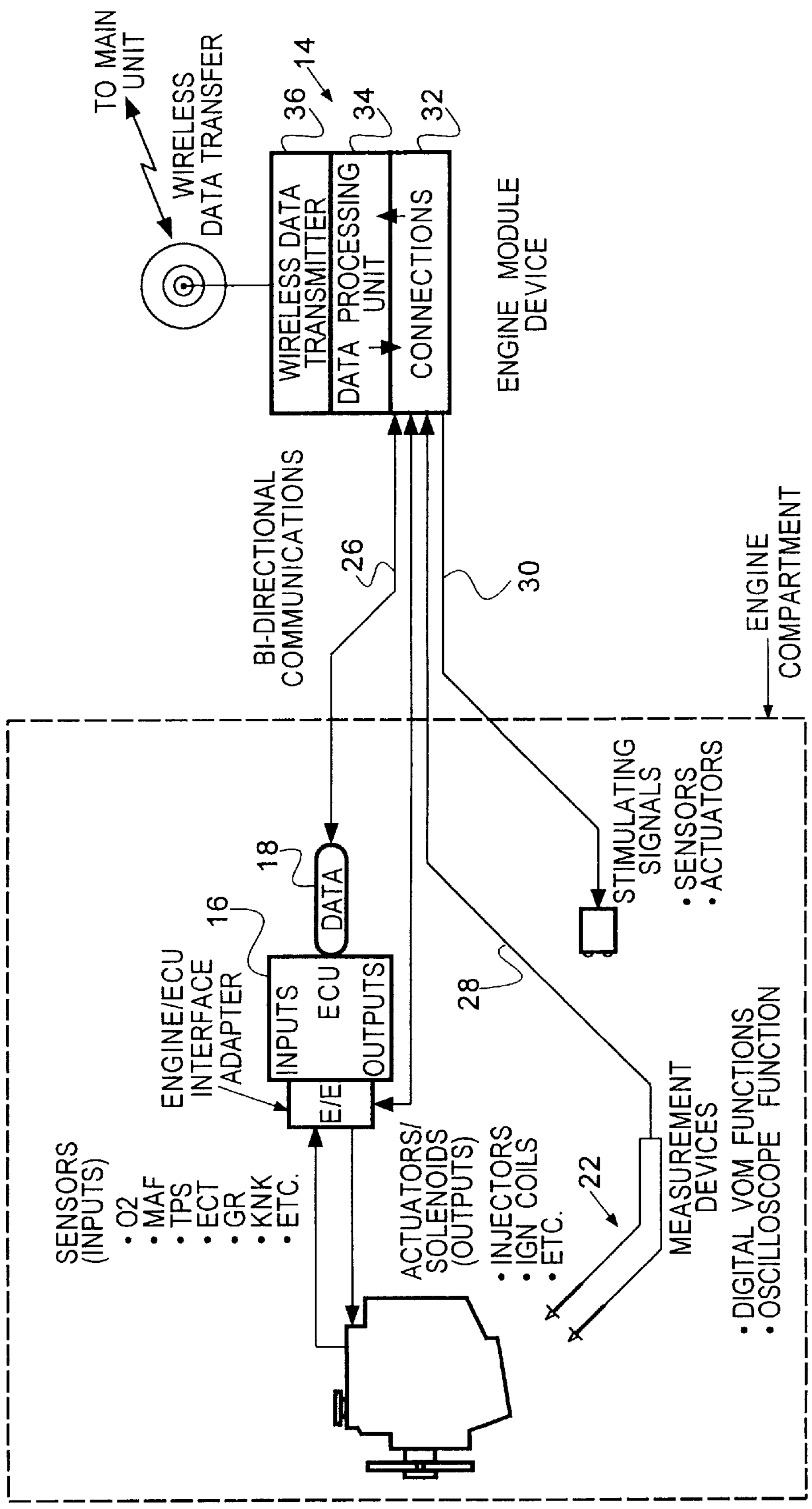
FIG. 2 depicts the engine pod of FIG. 1 interconnected with a test vehicle.

Under the embodiment, the engine pod 14 (FIG. 2) includes a wireless data transceiver 36, a data processing unit 34 and a connections section 32. The transceiver 36 is used to exchange data with the main unit 12. The data processing unit 34, and connections sections 32 are used to exchange data with a test vehicle.

The engine pod 14 has a number of interconnection cables 26, 28, 30 for sensing and controlling operation of a test vehicle. One of the primary interconnections with a test vehicle is a data connection achieved through a connector cable 26. The data connection 26 may be a bus connection under an OEM or vehicle specific configuration or protocol. The data connection 26 is used primarily to interact with, and interrogate, the engine control unit (ECU) 16. For example, the data processing unit 34 may interrogate the ECU 16 for stored trouble codes. Alternatively, the data processing unit may interrogate the ECU for engine operating parameters (e.g., engine coolant temperature, atmospheric pressure, throttle position, etc.) that are read and stored internally by the ECU 16 during normal processing operations.

In certain limited situations, the data processing unit may also be able to initiate test procedures internal to the ECU 16 and to receive the test results. The data processing unit, in some cases, may also be able to put the ECU 16 into a slave mode thereby allowing the data processing unit 16 to control the engine directly.

Figure 3A:
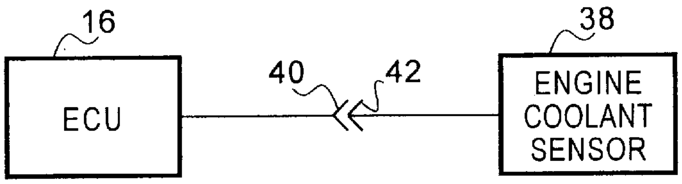
FIG. 3 depicts interconnection details of the engine pod of FIG. 2.

The data processing unit 14 may also simulate certain engine signals for purposes of testing for proper ECU and/or sensor operation. For example, one of the sensors 20 of FIG. 2 may be an engine coolant sensor. During normal engine operation the engine coolant sensor (reference 38 in FIG. 3*a*) may be interconnected with the ECU 16 through use of a connector (i.e., male plug 42 and female socket 40). To interconnect with the engine coolant sensor 38, the connector 30 of the engine pod 14 may be equipped with male plug 46 and female socket 44. To test the engine coolant sensor 38 and ECU 16, the connector 40, 42 is pulled apart and the female socket 40 of the ECU 16 is connected to the male plug 46 of the data processing unit 14. Likewise the male plug 42 of the engine coolant sensor 38 in connected to the female socket 44 of the data processing unit 14. Interposing the engine pod 14 between the engine coolant sensor 38 and ECU 16 allows the engine pod 14 to test both engine coolant sensor 38 and the reaction of the ECU 16 to a variety of simulated engine coolant temperatures.

The engine pod 14 also provides a number of measurement devices 22 for engine parameters not monitored by the ECU 16, but still important for troubleshooting purposes. For example, a Hall effect sensor may be clamped around a battery cable for detecting and measuring starting currents. A resistive sensor and appropriate opto-isolator may be used to sense and measure ignition spark. The measurement devices may also include redundant devices (e.g., a thermal sensor for engine coolant) where the output of a particular sensor (e.g., the engine coolant sensor 38) is believed to be operating outside of manufacturer's specifications relating to allowable error.

The data processing unit 34 of the engine pod 14 functions as a communications processor in exchanging data and commands between the vehicle under test and the main unit 12. To facilitate communication between the engine pod 14 and main unit 12, a wireless transceiver 36, 40 has been provided in both, the engine pod 14 and main unit 12.

The wireless transceivers 36, 40 may operate under any appropriate format (e.g., frequency modulation (FM), spread spectrum, etc.). However, it is contemplated that the transceivers 36, 40 would operate at relatively low output power levels (i.e., less than 100 mW) and therefore not require a FCC license.

Under a preferred embodiment, the transceivers 36, 40 may operate under a full-duplex, spread spectrum format using frequency hopping. Under the embodiment, a predetermined, frequency list is entered into the main unit transceiver 40 and engine pod transceiver 36. Hopping occurs at regular intervals. Between each hop, a frame of information is exchanged between the main unit transceiver 40 and engine pod transceiver 36. Error correction (e.g., convolutional coding) or error detection (e.g., parity checking) and re-transmission may be used for those engine parameters that change rapidly, or the system 10 may simply rely on parameter averaging to ensure reliable input. For command transmission from the main unit processor 38 to the engine pod processor 34, the engine pod processor 34 may acknowledge receipt of commands by echoing the command or the main processor 38 may simply set a timer and wait for the data requested by the command. Standard data flow control (i.e., X-ON, X-OFF) may be used by the transceivers 36, 40 to control data transfers from a first data processing unit 34, 38, through a respective modem (not shown) and transceiver 36, 40 to a respective second data processing unit 36, 40.

Figure 4:
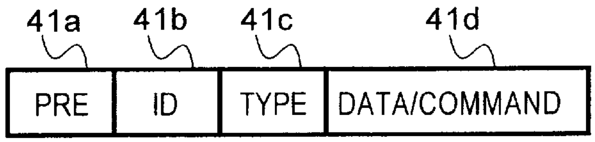
FIG. 4 depicts a data frame of the wireless interface between the engine pod and the main unit of FIG. 1.

FIG. 4 depicts an example of the data frame structure 41 that may be used for the wireless exchange of information between the main processor 38 and the engine pod processor 34. As shown, a preamble 41*a* is used at the beginning of each frame to synchronize a receiving transceiver 36, 40 to an incoming frame. An identifier (ID) 41*b* of the system 10 is provided to ensure that the frame originated from within the system 10. A data type field 41*c* is included to notify the receiving processor 34, 38 as to whether the field 56 is data or command.

Under the embodiment, the main unit 12 analyzes the test vehicle under a variety of formats. The formats may be based upon observed problems (e.g., hard starting, poor acceleration, bogs down at certain speeds, poor fuel economy etc.), upon a global collection and evaluation of test parameters or upon the measuring of individual parameters. In any case, selectable test options are presented to an operator (not shown) on a display screen 46 in an appropriate form (e.g., pull-down menus).

Figure 3B:
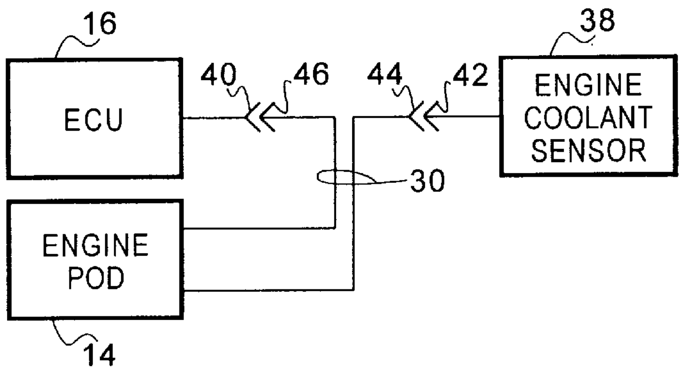

To use the system 10 for fault analysis, the engine pod 14 is interconnected with the test vehicle. Interconnecting the engine pod 14 to the test vehicle may include placing and securing the engine pod 14 within the engine compartment of a test vehicle and interconnecting the engine pod 14 with appropriate test points of the vehicle under test. Where the test vehicle has a test port 18 on the ECU 16, an interconnect cable 26 is connected between the engine pod 14 and ECU 16 of the vehicle as has been described above. Where the ECU 16 does not have a test port, the procedure described in reference to FIG. 3 may be used where the engine pod 14 is interposed, for data collection and control, between the ECU 16 and engine 24 of the test vehicle.

Testing may be accomplished under either of three scenarios. First, the engine pod 14 may control the engine 24 directly by signals transmitted to, and received directly from, the engine 24. Second, the engine pod 14 may pass signals transparently from engine 24 to ECU 16, and vice versa, while monitoring and measuring appropriate signal parameters. Under a third scenario, the engine pod 14 may operate in a mixed mode by intercepting certain signals passing between engine 24 and ECU 14 and substituting its own signals.

During use, the main unit 14 of the system 10 may be placed in a convenient location near the vehicle for the exchange of test data through the respective transceivers 36, 40. Alternatively, where the vehicle must be tested under highway conditions, the main unit 12 may be placed within the passenger compartment of the vehicle for data collection.

Upon start-up of the system 10, the operator is queried by the processor 38 of the system 10 for a make and model of the vehicle to be tested (which the operator must then enter to proceed with the analysis). The operator is then presented with at least three selectable options (e.g., pull-down menus). One option may be labeled "TEST", the second may be labeled "SYMPTOMS", and the third may be labeled "HELP". If the operator wants to test certain aspects of a vehicle, he selects the TEST menu. Upon selecting the TEST menu a series of additional options are presented to the operator. One option may be an option labeled "ELECTRICAL SYSTEM". Another option may be labeled "EMISSION CONTROL". A third option may be "ENGINE TIMING". If the operator selects ELECTRICAL SYSTEM, another series of menus will be presented. A functional outline of selectable options for the vehicle under test may be provided with a selected option highlighted on the display 46. One option may be "CHARGING CIRCUIT". Another option may be "BATTERY VOLTAGE". A third option may be "STARTING CURRENT".

If the vehicle under test has been reported having a starting problem, the operator may select both BATTERY VOLTAGE and STARTING CURRENT. In response, the processor 38 instructs the engine pod processor 34 to monitor battery voltage and starter current. The battery voltage and starting current may both be displayed simultaneously on the display 46 as an instantaneous value and as a 30 second histogram scaled to a 30 second rolling average of the readings. The operator may then attempt to start the vehicle and observe the results.

If the operator had selected the SYMPTOMS option at the beginning of the test, a similar result may have been achieved through a different route. Upon selecting the SYMPTOMS option, a list of symptoms may appear such as "HARD STARTING", "POOR ACCELERATION", "BOGS DOWN", "POOR FUEL ECON". On selecting HARD STARTING, the system 10 may respond with other questions such as "IS THE VEHICLE USED REGULARLY?" or "HOW OLD IS THE BATTERY?".

The operator may respond to the questions or select an option labeled "RECOMMENDATION". Upon selecting RECOMMENDATION, a set of recommended tests are presented along with a box for a check mark beside each test. The recommended tests for hard starting may be "CHECK BATTERY" and "MEASURE STARTING CURRENT". If the operator checks both boxes the instantaneous values and histogram appears as above, with one addition. Under the embodiment, the histogram is no longer sized for the incoming data but, instead, is sized consistent with the manufacturer's specifications for maximum starting current and minimum battery voltage. When the operator now starts the vehicle, the system 10 provides visual indication on the display 46 of any non-conforming measured parameters. For example, if the battery voltage fell below a threshold value, the system 10 indicates such condition by a indication (e.g., a flashing warning) of such condition.

Alternatively, the operator may not have any information about the vehicle's condition and may select an "AUTO TEST" option. The AUTO TEST option causes the system 10 to monitor certain critical functions and to perform other tests based upon the vital functions. For example in the case of hard starting, the system 10 would have no information about vehicle condition. The system 10, instead, would monitor critical functions such as battery voltage, ignition system, fuel injection system and emissions sensors. When the operator starts the engine, the system 10 may note battery voltage during starting and time to start the engine. If either parameter exceeded certain threshold levels (e.g., battery voltage too low), the system would take other measurements and, in certain cases, make certain adjustments.

If the battery voltage were judged to be too low, the system would measure starting current and take the further step of measuring a vehicle temperature (outside temperature) as a means of determining battery starting capacity at that temperature. If the vehicle temperature were judged to be in the 0 degree fahrenheit range, the system 10 may determine that battery capacity may be one-half the capacity at 70 degrees fahrenheit and adjust thresholds accordingly.

If the vehicle temperature were in the 70 degree range, the system 10 would compare the starting current with a threshold value for that temperature. If the starting current and battery voltage were outside threshold values for those conditions the system 10 may advise the operator that battery replacement may be indicated.

A further aspect of the system 10 is the provision of facilities for technical communication. Under the embodiment, technical and tutorial information is provided through a video communication system 64 and an audio/data communication system 42.

Figure 5:
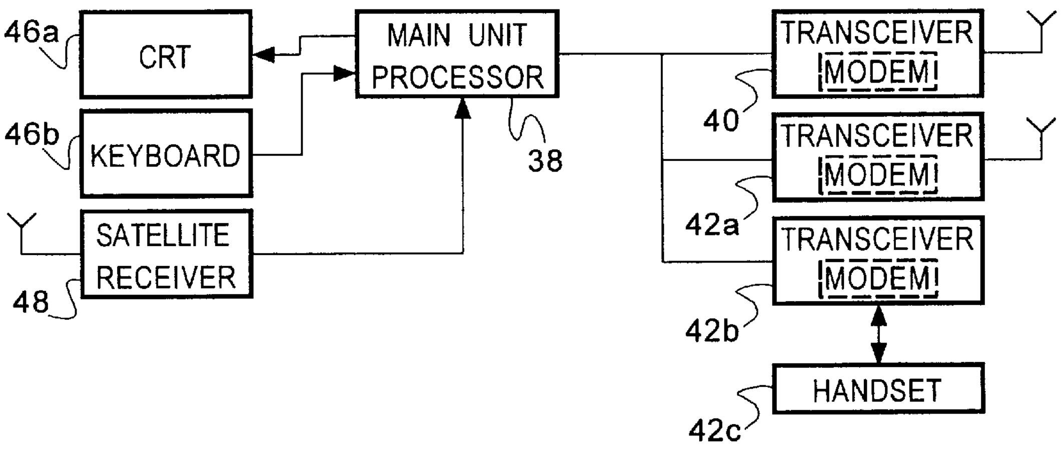
FIG. 5 is a block diagram of the main unit of FIG. 1.

FIG. 5 is a block diagram of the main unit 12. As shown, the main unit processor 38 in interconnected with two transceivers 40, 42. The first transceiver 40, as described above, allows for data collection from the test vehicle without a physical connection between the main unit 12 and the engine pod 14.

The second transceiver is a cellular transceiver 42 (or cordless phone equipped for voice/data) and is equipped for voice/data operation. Under the embodiment, data may be routed through a first transceiver 42*a* while voice is routed through a second transceiver 42*b*. A handset 42*c* is provided for use in conjunction with the voice transceiver 42*b* for use by the operator.

Alternately, transceivers 42*a* and 42*b* may be combined into a single transceiver 42 sharing the same duplex channel. Sharing of the duplex channel may be accomplished under some appropriate well-known channel sharing routine (e.g., time division multiplex, packet switching etc.).

Figure 6:
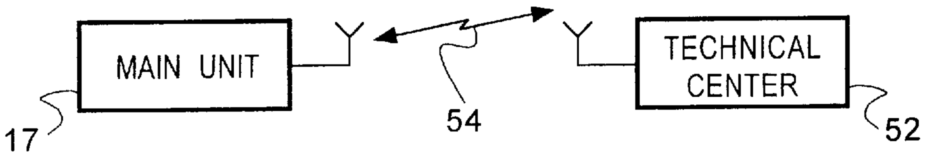
FIG. 6 depicts the interconnect between the main unit of FIG. 1 and the technical center.

When the operator encounters technical difficulties, the operator may activate an interconnect 54 (FIG. 6) with a technical center 52 (FIG. 6) through the cellular transceiver 42 The operator may also access general educational information about cars through the video link 47. The interconnect 54 may be voice only or voice/data depending on the circumstances. While the interconnect 54 of FIG. 6 is shown as being a radio frequency (RF) link, it is understood that the interconnect 54 would be some combination of cellular and public switch telephone network (PSTN) services.

Figure 7:
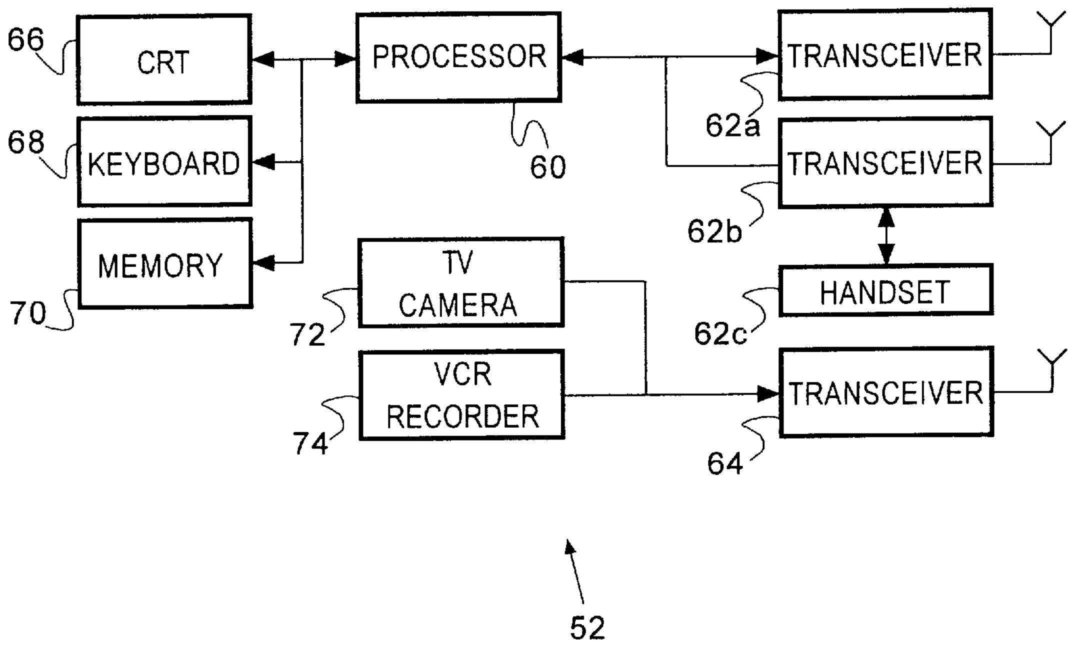
FIG. 7 is a block diagram of the technical center of FIG. 6.

Shown in FIG. 7 is a block diagram of the technical center 52 and video production facilities. As with the main unit 12 of FIG. 5, the technical center 52 may also use two transceivers 62*a*, 62*b* for the interconnect 54, or transceivers 62*a*, 62*b* may be combined into a single transceiver 62 using channel sharing.

Under the embodiment, the operator may activate the interconnect 54 by selecting the HELP option. Typically, if the operator only had a technical question, he would only activate an audio portion of the interconnect 54. If, on the other hand, the operator wished to retrieve technical information from the technical center 52, the operator or the technician would activate the full capabilities of the interconnect 54. While the technical center 52 and video production facilities are shown as occupying the same geographic location, it is understood that the video production facility could be located remote from the technical center 52.

Where two transceivers 42*a*, 42*b*, 62*a*, 62*b*, are used for the interconnect 54, the selection of an audio portion of the interconnect 54 would only entail activation of transceivers 42*b* and 62*b*. Where full communications capabilities are necessary a duplex channel would be opened between transceivers 42*a* and 62*a* and between 42*b* and 62*b*.

Likewise where a single transceiver 42 were used at the main unit 12 and a single transceiver 62 at the technical center 52, the activation of an audio portion of the interconnect 54 may result in the set-up of a voice channel without channel sharing. Any subsequent necessity for data exchange would simply cause the processor 38 of the main unit 12 and the processor 60 of the technical center 52 to divide the channel for voice and data.

On selecting the help option, the main processor 38 causes the cellular transceiver 42 to go off-hook. The main processor 38 then transfers a telephone number of the technical center 52 to the transceiver 42. A modem inside the transceiver 42 causes the telephone number of the technical center 52 to be transferred from the transceiver 42 to a nearby cellular base station (not shown) which, in turn, sets up the interconnect 54 with the technical center 52 through the PSTN.

Upon completion of the audio connection, the operator may discuss the technical problem with a technician (not shown) located at the technical center 52, reach an understanding of a solution to the problem, and hang-up. The technician at the technical center 52 may also want more information about the problem, and information previously gathered. To gather more information, the technician may activate a data link through the interconnect 54 via a menu selection on a CRT 66 through transceivers 42*a* and 62*a* with the main unit 12. Upon establishing the data link with the main unit 12, the technician at the technical center 52 may seize control of the main unit 12 through the data link. To do this the processor 60 of the technical center 52 may "slave" the processor 38 of the main unit 12 to the commands of the processor 60 through the data link. Alternatively, the technician at the technical center 52 may enter a passive monitoring mode by requesting the processor 38 of the main unit 12 send a copy of each screen appearing on the CRT 46*a* to the CRT 66 of the technical center 52. The technician may also step through previous commands entered by the operator.

By allowing for passive monitoring of the CRT 46*a* and/or active control of the main unit 12, the technician of the technical center 52 can provide the important service of tutoring the operator of the main unit 12 in the use of the main unit 12. By maintaining parallel audio and data paths over the interconnect 54, the technician of the technical center 52 can instruct the operator on the use of the main unit 12 while monitoring the operator's performance.

Alternatively, by entering the active mode of directly controlling the processor 38 of the main unit 12, the technician of the technical center 52 can demonstrate features and operating procedures that may not be familiar to the operator of the main unit 12. The technician may directly control the processor 38 of the main unit by substituting the output of the keyboard 68 of the technical center 52 for the output of the keyboard 46*b* of the main unit 12 at the keyboard input port of the processor 38. Pull-down menus activated by the technician may appear before the operator on the CRT 46*a* of the main unit 12 as the technician activates features and makes tests as necessitated by the circumstances.

The technician of the technical center 52 may also be made to look as if he were controlling the processor 38 by loading a similar software package into the processor 60 of the technical center and feeding images of CRT 66 of the technical center 52 back to the CRT 46*a* of the main unit 12. The processor 38 of the main unit 12, in such a case, operates in a truly slave mode functioning to simply forward data and commands received through the interface 54 to the engine pod 14 and from the engine pod 14 to the processor 60 of the technical center 52.

In another embodiment of the invention, operator training (tutoring) is enhanced by an audiovisual signal provided from the technical center 52 via a closed circuit television link 47 to a portion of the CRT 46*a* of the main unit 12. Under the embodiment, a television camera 72 and transmitter 64 located at the technical center 52 may transmit a one-way audiovisual signal to a receiver 48 of the main unit 12. Alternately, a pre-recorded audiovisual signal may by provided from a VCR Recorder 74. The signal may be transmitted by satellite (using the National Television System Committee (NTSC) or PAL standard), CCTV, or any other well known method of audiovisual transmission. An operator of a main unit 12 is able to ask questions and engage in a two-way conversation with an instructor (not shown) at the technical center 52 by activating the interconnect 54 between his main unit 12 and the technical center 52. Alternatively, the video production facilities may be located remote from the technical center 52 and may be accessed by an operator through a second interconnect 54.

Under the embodiment, operator training is enhanced by providing a visual image of a technician using a main unit 12 and engine pod 14 such as that shown in FIG. 1. Such an image is useful in teaching an operator of the main unit 12 how to use the main unit 12 and engine pod 14 and in teaching an operator general automotive diagnostics.

Under the embodiment, the instructor at the technical center 52 may illustrate the process of accessing schematics and wiring diagrams from the CD-ROM 37 of a particular vehicle through the audiovisual link 47. The instructor may then request that each operator of a main unit 12 do likewise. Where an operator is unsuccessful, the operator activates the interconnect 54. The instructor at the technical center 52 via the data link of the interconnect 54 may query the main unit 12 to determine what the operator of the main unit 12 has failed to do or has done wrong. Upon making such a determination the instructor at the technical center 52 may then instruct the operator of the main unit 12 what steps, if any, necessary to complete the request.

The combination of an audiovisual and data link between the main unit 12 and the technical center 52 provides a powerful tool in the process of training main unit operators. The fact that the interconnect 54 can be activated at will allows operators to become productive much faster with less training. The availability of help through the interconnect 54 makes operators much less fearful of making mistakes or creating conditions from which recovery is difficult.

A specific embodiment of a system analyzer and tutorial unit according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

What is claimed is:

1. A vehicle analyzer and tutorial system comprising:

an engine pod adapted to sense and control operation of an engine of a test vehicle;

an engine fault detection analyzer and display unit coupled to the pod through a first radio frequency interface, said engine fault detection analyzer having provisions for local control by a local technician and remote control from a technical center and provisions for transferring a copy of each screen appearing on the display to the technical center;

a remote controller and display unit at the technical center, operably interconnected with the engine analyzer and display unit through a communication interface comprising one of a radio frequency interface, a cellular interface and a telephone interface, for remotely monitoring the engine analyzer display, for displaying the copy of each screen and for optionally controlling the engine analyzer; and a satellite downlink disposed between the remote controller and display unit at the technical center and a plurality of the engine fault detection analyzer and display units, such downlink adapted for tutoring a plurality of operators of the plurality of engine fault detection analyzer and display units by an operator at the technical center.

2. The vehicle analyzer and tutorial system of claim 1 further comprising a satellite close-circuit television receiver operably coupled to the engine analyzer and display unit.

3. The vehicle analyzer and tutorial system of claim 1 wherein the radio frequency interface further comprises a duplex voice path.

4. The vehicle analyzer and tutorial system of claim 1 wherein the radio frequency interface further comprises a duplex data path.

5. The vehicle analyzer and tutorial system of claim 1 further comprising a first processor for analyzing a test parameter of a test vehicle and displaying such test parameter on a display along with indicia of acceptable values of the test parameter from a manufacturer of the test vehicle.

6. The vehicle analyzer and tutorial system of claim 1 wherein the vehicle system analyzer further comprises an engine pod and a main unit.

7. The vehicle analyzer and tutorial system of claim 6 wherein the engine pod and main unit exchange data over a wireless data link.

8. The vehicle analyzer and tutorial system of claim 7 wherein the engine pod further comprises a first processor for communicating a test reading from at least one test connection of the plurality of test connections to a second processor within the main unit.

9. The vehicle analyzer and tutorial system of claim 8 wherein the main unit further comprises a display for displaying the at least one test reading along with indicia of acceptable readings for the at least one test reading based upon a manufacturer's recommendation for the test vehicle.

10. The vehicle analyzer and tutorial system of claim 9 wherein the main unit further comprises a memory for storing indicia of acceptable readings for the at least one test reading based upon a manufacturer's recommendation for the test vehicle.

11. The vehicle analyzer and tutorial system of claim 6 wherein the engine pod is adapted to be interconnected with a test vehicle.

12. The vehicle analyzer and tutorial system of claim 6 wherein the engine pod further comprises a plurality of test connections for interconnection with the test vehicle.

13. The vehicle analyzer and tutorial system as in claim 1 further comprising means for transferring screens from the remote controller and display unit to the engine fault detection analyzer and display unit.

14. The vehicle analyzer and tutorial system as in claim 1 further comprising means for displaying instantaneous test values.

15. The vehicle analyzer and tutorial system as in claim 1 further comprising a closed circuit television link coupling the technical center and engine fault detection analyzer and display unit, said closed circuit television link being adapted to allow an instructor located at the technical center to tutor a user of the engine fault detection analyzer and display unit.

16. The vehicle analyzer and tutorial system as in claim 15 wherein the closed circuit television link further comprises a two-way audio interconnect between the instructor and user.

17. A vehicle analyzer and tutorial system comprising:

an engine pod secured within an engine compartment of a vehicle to be tested and coupled to an engine of the vehicle;

a vehicle system fault detection analyzer with a memory containing stored data and vehicle specification of the vehicle and a processor for comparing measured values of the vehicle collected by the engine pod with the data and vehicle specifications;

a first set of radio frequency transceivers adapted to form a radio frequency interface between the engine pod and the vehicle system fault detection analyzer and adapted to allow remote control of the engine pod by the vehicle system fault detection analyzer; and a communication interface, comprising one of a radio frequency interface, a cellular interface and a telephone interface, coupled to the vehicle system analyzer which optionally establishes a two-way data and control interconnect with a vehicle system analyzer technical center and which transfers a copy of each screen appearing on a display of the vehicle system fault detection analyzer to the technical center; and a satellite downlink disposed between the technical center and a plurality of the vehicle system fault detection analyzers, such downlink adapted for tutoring a plurality of operators of the plurality of vehicle system fault detection analyzers by an operator at the technical center.

18. The vehicle analyzer and tutorial system of claim 17 wherein the interconnect further comprises a duplex voice path.

19. The vehicle system analyzer and tutorial system of claim 17 wherein the interconnect further comprises a duplex data path.

20. The vehicle analyzer and tutorial system of claim 17 further comprising a first processor for analyzing a test parameter of a test vehicle and displaying such test parameter on a display.

21. The vehicle analyzer and tutorial system of claim 20 further comprising means for displaying indicia of acceptable values of the test parameter from a manufacturer of the test vehicle.

22. The vehicle analyzer and tutorial system of claim 17 wherein the vehicle system analyzer further comprises an engine pod and a main unit.

23. The vehicle analyzer and tutorial system of claim 22 wherein the engine pod and main unit exchange data over a wireless data link.

24. The vehicle analyzer and tutorial system of claim 23 wherein the engine pod is adapted to be interconnected with a test vehicle.

25. The vehicle analyzer and tutorial system of claim 24 wherein the engine pod further comprises a plurality of test connections for interconnection with the test vehicle.

26. The vehicle analyzer and tutorial system of claim 25 wherein the engine pod further comprises a first processor for communicating a test reading from at least one test connection of the plurality of test connections to a second processor within the main unit.

27. The vehicle analyzer and tutorial system of claim 26 wherein the main unit further comprises a display for displaying the at least one test reading along with indicia of acceptable readings for the at least one test reading based upon a manufacturer's recommendation for the test vehicle.

28. The vehicle analyzer and tutorial system of claim 27 wherein the main unit further comprises a memory for storing indicia of acceptable readings for the at least one test reading based upon a manufacturer's recommendation for the test vehicle.

29. The vehicle analyzer and tutorial system as in claim 17 further comprising means for receiving and displaying screens from the technical center.

30. The vehicle analyzer and tutorial system as in claim 17 further comprising means for displaying instantaneous test values.

31. The vehicle analyzer and tutorial system as in claim 17 further comprising a closed circuit television link coupling the technical center and engine fault detection analyzer and display unit, said closed circuit television link being adapted to allow an instructor located at the technical center to tutor a user of the engine fault detection analyzer and display unit.

32. The vehicle analyzer and tutorial system as in claim 31 wherein the closed circuit television link further comprises a two-way audio interconnect between the instructor and user.

33. A vehicle analyzer and tutorial system comprising:

an engine pod adapted to sense and control operation of an engine of a test vehicle;

an engine fault detection analyzer and display unit coupled to the pod through a radio frequency interface and to a technical center through a landline; and a satellite downlink disposed between the technical center and the engine fault detection analyzer and display unit, such downlink adapted for tutoring a operator of the engine fault detection analyzer and display unit by a training operator at the technical center.

* * * * *